United States Patent [19]

Kakumoto et al.

[11] 4,272,756
[45] Jun. 9, 1981

[54] METHOD OF PATTERN RECOGNITION AND APPARATUS THEREOF

[75] Inventors: Shigeru Kakumoto, Kodaira; Yoshiji Fujimoto, Hachioji; Kunihiro Okada, Hinodemachi, all of Japan

[73] Assignee: Hitachi, Ltd., Tokyo, Japan

[21] Appl. No.: 37,034

[22] Filed: May 8, 1979

[30] Foreign Application Priority Data

May 22, 1978 [JP] Japan .................................. 53-59933

[51] Int. Cl.³ .............................................. G06K 9/34
[52] U.S. Cl. ................... 340/146.3 H; 340/146.3 SG; 358/293
[58] Field of Search ................. 340/146.3 F, 146.3 H, 340/146.3 AE, 146.3 R, 146.3 SG; 358/293; 250/566

[56] References Cited

U.S. PATENT DOCUMENTS

| | | | |
|---|---|---|---|
| 3,234,327 | 2/1966 | McMann | 358/293 |
| 3,475,555 | 10/1969 | McMann | 358/293 |
| 3,925,760 | 12/1975 | Mason et al. | 340/146.3 ED |
| 3,962,681 | 6/1976 | Requa et al. | 340/146.3 H |
| 4,080,633 | 3/1978 | Starkweather | 358/293 |
| 4,149,091 | 4/1979 | Crean et al. | 358/293 |
| 4,199,784 | 4/1980 | Wellendorf et al. | 358/293 |

*Primary Examiner*—Leo H. Boudreau
*Attorney, Agent, or Firm*—Craig & Antonelli

[57] ABSTRACT

In an apparatus for pattern recognition provided with convertion means for converting a two-dimensional image carried on a picture into pattern signals, memory means for temporally storing the pattern signals from said convertion means, and recognition means for recognizing the pattern signals read out from said memory means, disclosed is a method wherein said picture is divided into a plurality of partial pictures in a manner that adjacent ones of the partial pictures hold in common a partially overlapped region, said convertion means convert, on a one-by-one basis of the partial pictures, the two-dimentional image into pattern signals to be stored in said memory means, and the stored pattern signals are, on a one-by-one basis of the partial pictures, read out to be recognized by said recognition means.

8 Claims, 19 Drawing Figures

METHOD OF PATTERN RECOGNITION AND APPARATUS THEREOF

BACKGROUND OF THE INVENTION

This invention relates to a method of recognition of two-dimentional pattern data carried on a large sized drawing, document or the like, and to an apparatus for carrying out the method.

Conventionally, for scanning characters on a document by means of an optical character reader (referred to as an OCR hereinbelow), a sensor having photo-electric conversion elements arranged in a one-dimensional fashion is conventionally used, and the sensor is moved with respect to the document for scanning the two-dimentional image.

In the case of scanning a large sized document whose width cannot wholly be covered by a single sensor, a method is known wherein a plurality of sensors and corresponding lenses are used in such a way that individual portions of the document may be focused through the lenses into images on the respective sensors in a manner that one scanning line due to one sensor and another scanning line due to the other sensor are positioned to be connected to each other at a common connection point for forming one continuous scanning line.

In such a conventional method, however, even if two scanning lines due to two sensors could be precisely positioned for connection at a common connection point, there is a possibility of discrepancy at the connection point in the resultant pattern data obtained by the sensors because of characteristic differences between the sensors and/or between the lenses and/or because of quantization errors, thus resulting in an undesirable influence on recognition of such pattern data.

Further, in recognition of the pattern data obtained by a plurality of sensors, the whole pattern data must be stored in a temporary memory, which requires a very large storage capacity.

In an apparatus for recognition of a large sized drawing such as a draft, there are also similar problems as the above, and effective solutions of such problems have not yet been found.

SUMMARY OF THE INVENTION

Accordingly, the invention has the primary object of providing a method of pattern recognition and an apparatus for performing that method which can assure a highly accurate recognition of pattern data and wherein the capacity of the frame memory for storing pattern data can be small.

For achieving such objects, according to the present invention, a picture to be recognized is divided into a plurality of small partial pictures in a manner that adjacent partial pictures may hold in common an overlapped region, recognition of the pattern data of the picture is made on a one-by-one basis of the partial pictures, and the resultant recognitions are tallied with respect to one another for providing recognition of the data as a whole.

The above and other objects and advantages of the invention will be more fully apparent from the following detailed description made in conjunction with the accompanying drawings.

DETAILED DESCRIPTION OF THE PREFERRED EMBODIMENTS

First, the principle of the method of pattern recognition of the invention will be described in conjunction with FIG. 1 wherein an example of reading a large sized drawing is shown.

Figure 1:
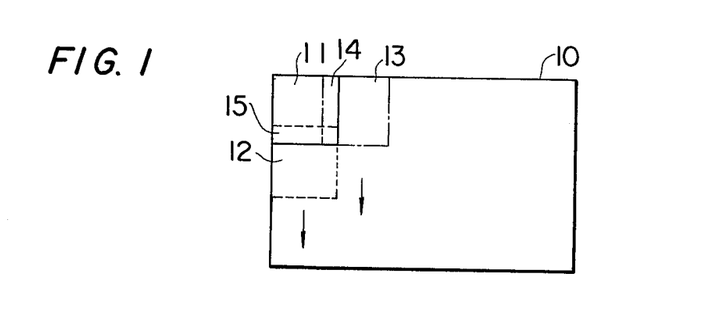
FIG. 1 is a schematic view for explaining the principle of the method of pattern recognition according to the present invention.

As seen in FIG. 1, a whole picture 10 is divided into a plurality of small regions or partial pictures 11, 12, 13, ..., each region being of a size which can be processed at one time. Adjacent regions 11 and 13, for example, of the divided regions hold in common a partially overlapped region 14, and similarly, adjacent regions 11 and 12 hold in common a partially overlapped region 15. Reading of data of such large sized picture 10 is made on a one-by-one basis of such divided small regions. For example, photo-electric conversion is effected with respect to the regions 11 and 12 one by one in this order as shown by the arrow, and similar photo-electric conversion is effected with respect to the row of regions including the region 13. All of the pattern data of the respective divided small regions obtained by photo-electric conversion in such manner is then processed for recognition in sequence, until a reading of all of the pattern data has been completed.

Figure 2:
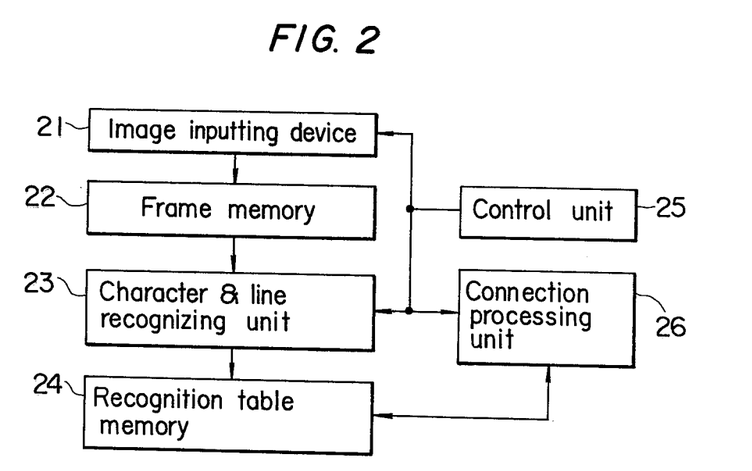
FIG. 2 is a block diagram showing an embodiment of the large sized drawing reader which is disposed to operate in accordance with the method of pattern recognition of the present invention.

FIG. 2 is a block diagram of an embodiment of the large sized drawing reader in accordance with the method of pattern recognition of the present invention. In FIG. 2, the numeral 21 indicates a pattern or image inputting device for receiving pattern signals from a divided region of a picture; the numeral 22 identifies a frame memory for storing pattern signals from a divided region of the picture; the numeral 23 identifies a character & line recognizing unit; the numeral 24 identifies a memory for storing recognition table; the numeral 25 identifies a control unit; and the numeral 26 identifies a connection processing unit.

Figure 3:
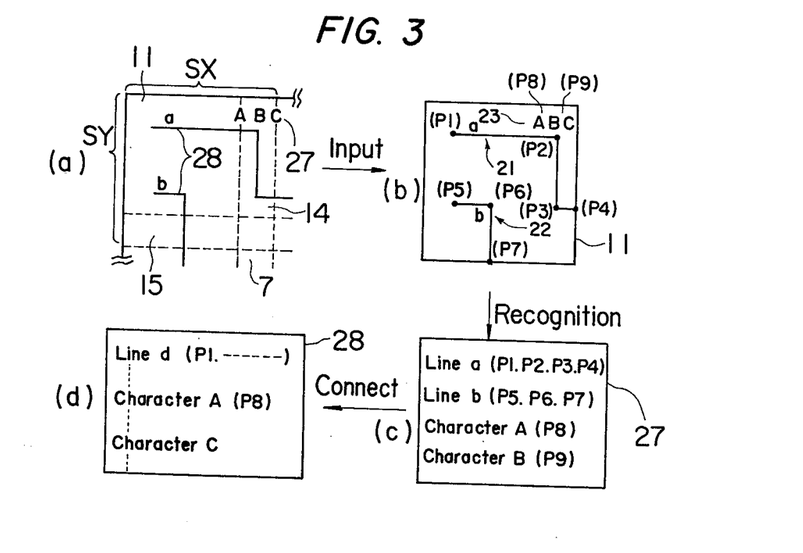
FIGS. 3(a) to 3(d) are diagrams for explaining the action of the reader of FIG. 2.

A drawing, such as a draft, includes therein, as a rule, characters 27 and lines 28, as shown in FIG. 3(a).

For reading the large sized picture 10 which includes therein such characters and lines, first, the divided small region 11, for example, which has a horizontal length SX and a vertical length SY, is photo-electrically converted by the pattern inputting device 21, and the resultant pattern signals are stored, after being subjected to pre-processing, such as a thresholding operation, in the frame memory 22.

Thus, the region 11 is stored as converted pattern data in the memory 22 as shown in FIG. 3(b) wherein $p_i$ (i=1, 2, 3, . . . ) represents the co-ordinates thereof. Then, the pattern data which has been stored in the memory 22 is read out and sent to the character & line recognizing unit 23 for recognition of the characters and lines in the divided picture region. As a result of such recognition, a recognition table 27 for the divided pictures, as shown in FIG. 3(c) is obtained and is stored in the memory 24. In such recognition, a line can be represented by co-ordinates of feature points such as terminal points and bending points. For example, the line a can be represented by the co-ordinates $p_1$, $p_2$, $p_3$, $p_4$ as a line a ($p_1$, $p_2$, $p_3$, $p_4$). A character can be represented by the sort of character and the co-ordinates thereof. For example, a character A can be represented as a character A ($p_8$). Further, though not shown in the figure, a curved line can be represented by means of a polygonal line approximation technique. Upon termination of the recognition of the region 11, the next region 12 is taken for recognition processing in a similar manner as the above. In such manner, divided pictures in all the regions or in desired regions of the large sized picture 10 are recognition processed.

Thus, in the memory 24 are stored the recognition results for the respective partial pictures as the recognition table 27 for the partial pictures. The contents of the partial picture recognition table 27 are read out and selected for connection between the recognition results of the adjacent partial pictures, thus forming a recognition table 28, as shown in FIG. 3(d), which is stored in the memory 24.

As described above, an adequate overlapping region has been provided in adjacent partial pictures. Accordingly, a character C (FIG. 3(a)), for example, which is incapable of recognition by the recognition of the region 11 alone because the region 11 includes therein only a part of the character, can be recognized in its complete form by further recognition of the adjacent region 13 which includes therein the remainder of the character C, thus correct and complete recognition results are obtained in the recognition table 28. A character B, for example, which is contained in its complete form in both of adjacent small regions, will be contained in both recognition results of the respective regions. At the time of connection of such two recognition results, however, one of the recognition results is eliminated, and only the other one of the recognition results is registered in the recognition table 28.

As also described above, after one partial picture has been stored in the frame memory 22 and recognition processed, the next partial picture is stored in the frame memory 22, and accordingly, the frame memory 22 is required to have only a capacity which is sufficient for storing one partial picture. Thus, the storage capacity required for the memory 22 is very small as compared with the case where the memory is required to store the undivided whole picture.

In the construction shown in FIG. 2, the operations of the pattern inputting device 21, the character & line recognizing unit 23 and the connection processing unit 26 are controlled by control signals and timing signals from the control unit 25.

The operation of each part of the apparatus shown in FIG. 2 will now be described in detail.

Figure 4:
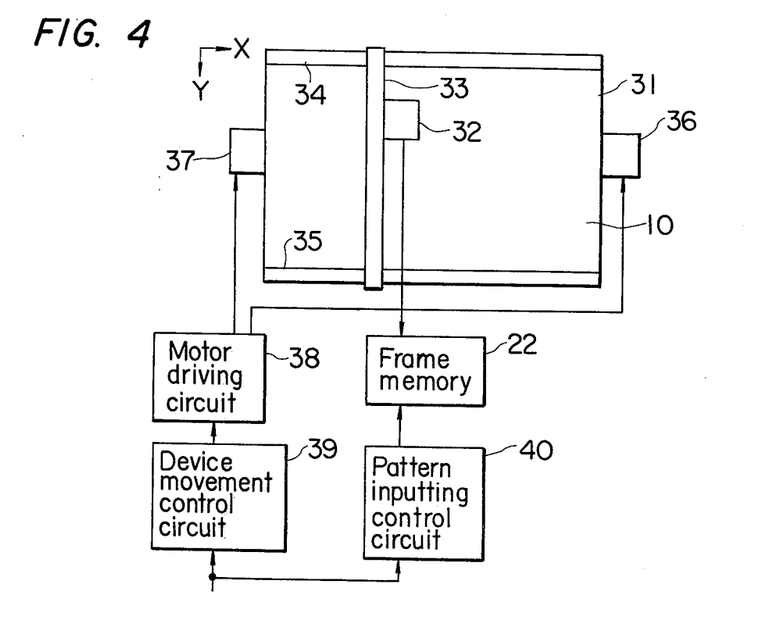
FIG. 4 shows in detail an example of the construction of the pattern inputting device in the reader of FIG. 2.

FIG. 4 shows in detail an example of the construction of the pattern imputting device 21 shown in FIG. 2.

In FIG. 4, the numeral 31 indicates a table for carrying drawings; the numeral 32 identifies an image inputting device consisting of a television camera or the like; the numeral 33 represents a movable rail; the numerals 34 and 35 indicate fixed rails on which the movable rail 33 rides; the numeral 36 indicates a motor for moving the image inputting device 32 along the rail 33; the numeral 37 represents a motor for moving the movable rail 33; the numeral 38 identifies a motor driving circuit for energizing the motors 36 and 37; the numeral 39 identifies a control circuit for controlling movement of the image inputting device 32 via driving circuit 38; and the numeral 40 identifies a control circuit for pattern inputting. Further, the numeral 10 indicates the large sized undivided whole picture, and the numeral 22 identifies the frame memory which forms part of the system of FIG. 2.

In the construction as described above, a movement target value for the image inputting device 32 is set in the image inputting device movement control circuit 39 from the control unit 25, thereby to drive through the motor driving circuit 38 the movable rail moving motor 37 and the image inputting device moving motor 36 to move the image inputting device 32 along the movable rail 33 in the Y direction and, at the same time, move the movable rail 33 along the fixed rails 34 and 35 in the X direction. Thus, the image inputting device 32 is moved to the target position. Such a mechanism for moving the image inputting device 32 and the movable rail 33 may be a known mechanism, and accordingly the detailed construction thereof is not described herein.

Then, upon instruction of a starting input being given to the pattern inputting control circuit 40 from the control unit 25, signals of the image of the divided picture in a divided small region, which have been picked up by the television camera or the like of the image inputting device 32, are pre-processed, and the results of such pre-processing are stored in the frame memory 22.

In a similar manner, further movement target values are inputted to the circuit 39 in sequence, and, each time, the partial picture in a corresponding divided small region is stored in the frame memory 22.

In the case of employing array sensors arranged linearly in the X direction in the image inputting device 32, the image inputting device 32 may first be moved to a target position, and then be moved in the Y direction a distance corresponding to the divided small region while image signals are being inputted, and, after this, the image inputting device 32 may be moved back a distance corresponding to the overlapped region for inputting of image signals from the partial picture in the adjacent divided small region.

As to the pattern inputting device 21, the image inputting device 32 may be fixed at a position and the drawing may be moved with respect to the device 32, or alternatively, a plurality of image inputting devices may be provided for covering the whole of a picture or desired portions thereof, and outputs from the plurality of image inputting devices may be selectively taken out.

Figure 5:
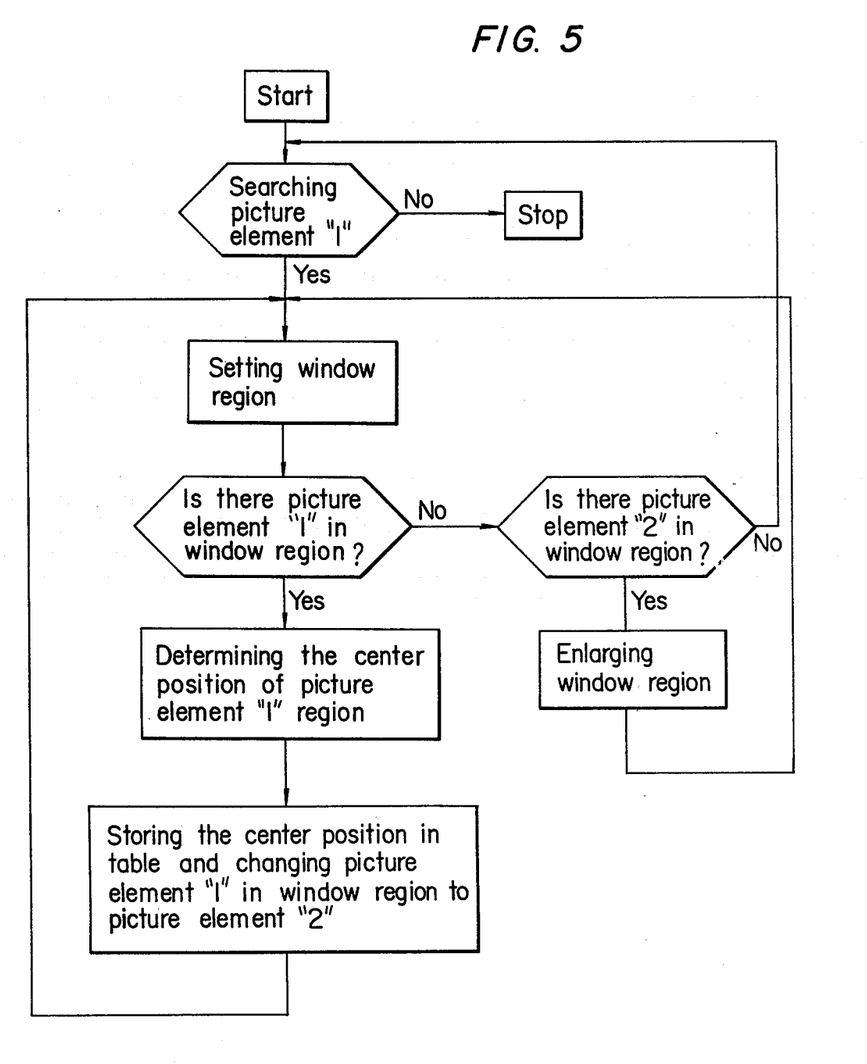
FIG. 5 is a flow diagram showing the steps of the process performed in the character & line recognizing unit in the reader of FIG. 2.

FIG. 5 shows an example of the process of line recognition performed in the character & line recognizing unit shown in FIG. 2.

Figure 6A:
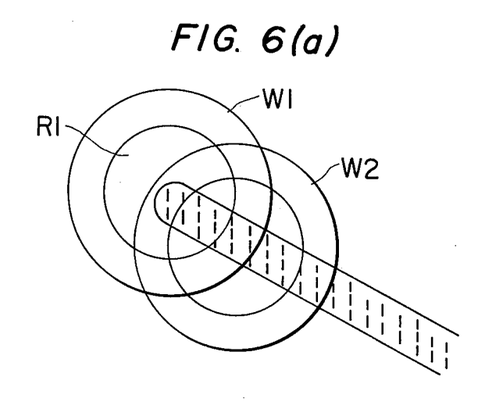
FIGS. 6(a) and 6(b) are diagrammatic views for explaining in detail the process according to the flow diagram of FIG. 5.

According to FIG. 5, first, picture data which has been stored in the frame memory 22 is taken out according to a predetermined order to search for a picture element "1" (black picture element). Upon detection of the picture element "1", a ring-shaped window region $W_1$ is established taking the picture element as the center thereof, as shown in FIG. 6, and this window region is searched for other picture elements. When other pictures elements "1" are found in the window region $W_1$, the center position of a region which contains therein these other picture elements "1" is then determined, and another window region $W_2$ is established taking this center position as the center thereof. At the same time, the picture elements "1" which are contained in the window region R1 $W_1$ and in an inner circular region, which is contained in the region $W_1$, are made into particular picture elements "2". Then, the window region $W_2$ is searched for picture elements to detect picture elements "1" contained therein. In such a manner, line tracing can be performed.

Figure 6B:
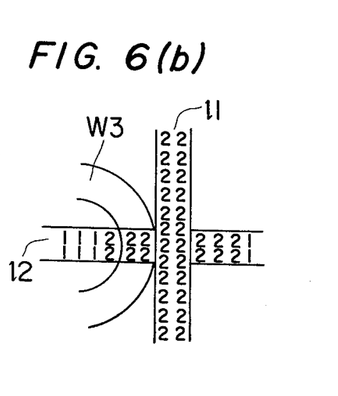

In the case where line tracing of a line $l_1$ has finished and there is a line $l_2$ which intersects the line $l_1$ and is now under line tracing, if a window region $W_3$ is established, as shown in FIG. 6(b), there will be no picture element "1" in this window region, and accordingly there is a possibility of misjudgement. In such a case, when the window region contains therein picture elements "2", then this window region is expanded so that detection of a picture element "1" in this expanded region can be obtained.

With such a technique as described above, lines on a picture can be traced, and line recognition can be obtained on the basis of co-ordinates which have been determined from such tracings.

Line tracing is not limited to the above-described technique. Various methods of line tracing have been proposed, and any of them can be employed.

As to recognition of characters in a picture, there have been various methods, and accordingly detailed description thereof is omitted here.

A known exclusive unit can be employed as the character & line recognizing unit 23, or alternatively a processor, such as a microcomputer, may be employed.

The principle of action of the connection processing unit 26 shown in FIG. 2 will now be described in conjunction with FIG. 7 which shows a case of connecting lines contained in partial pictures in two adjacent small regions.

Figure 7:
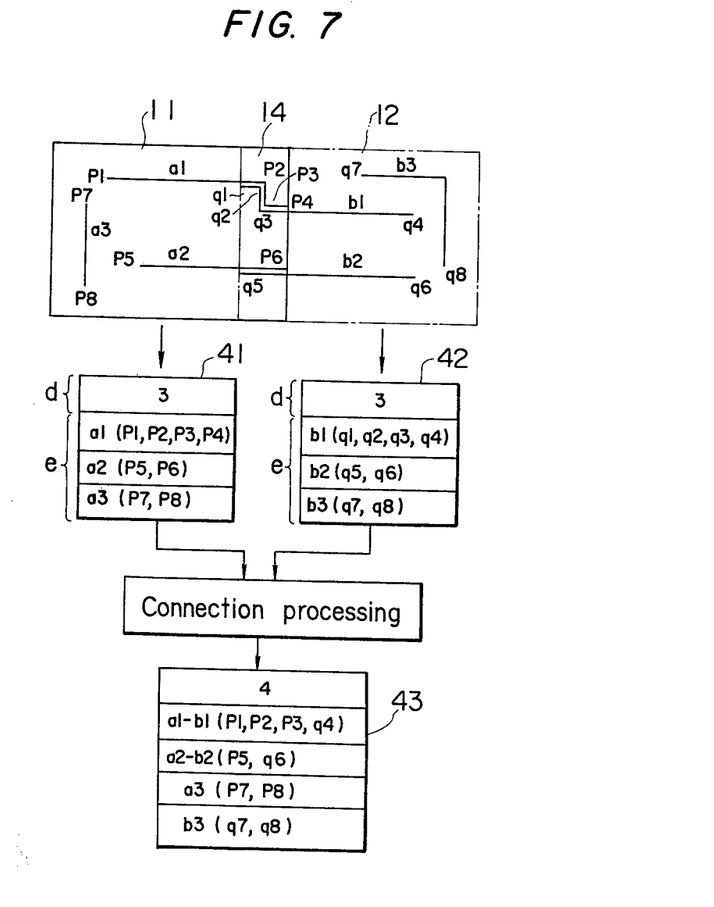
FIG. 7 is a schematic diagram showing the steps of the process performed in the connection processing unit in the reader of FIG. 2.

According to FIG. 7, the two adjacent small regions 11 and 13 hold in common the overlapped region 14. Suppose that the small region 11 includes therein lines $a_1$, $a_2$, $a_3$, and small region 13 includes therein lines $b_1$, $b_2$, $b_3$, then the numbers d of line connections and the co-ordinates e of feature points will be stored respectively in partial picture recognition tables 41 and 42 which correspond respectively to the regions 11 and 13, as shown in the figure. In the connection processing unit 26, the states of overlapping between the lines a and b in the overlapped region 14 are examined, feature point co-ordinates of the lines are selected for connection of the lines, and another recognition table 43 is fabricated and stored in the memory 24.

Figure 8:
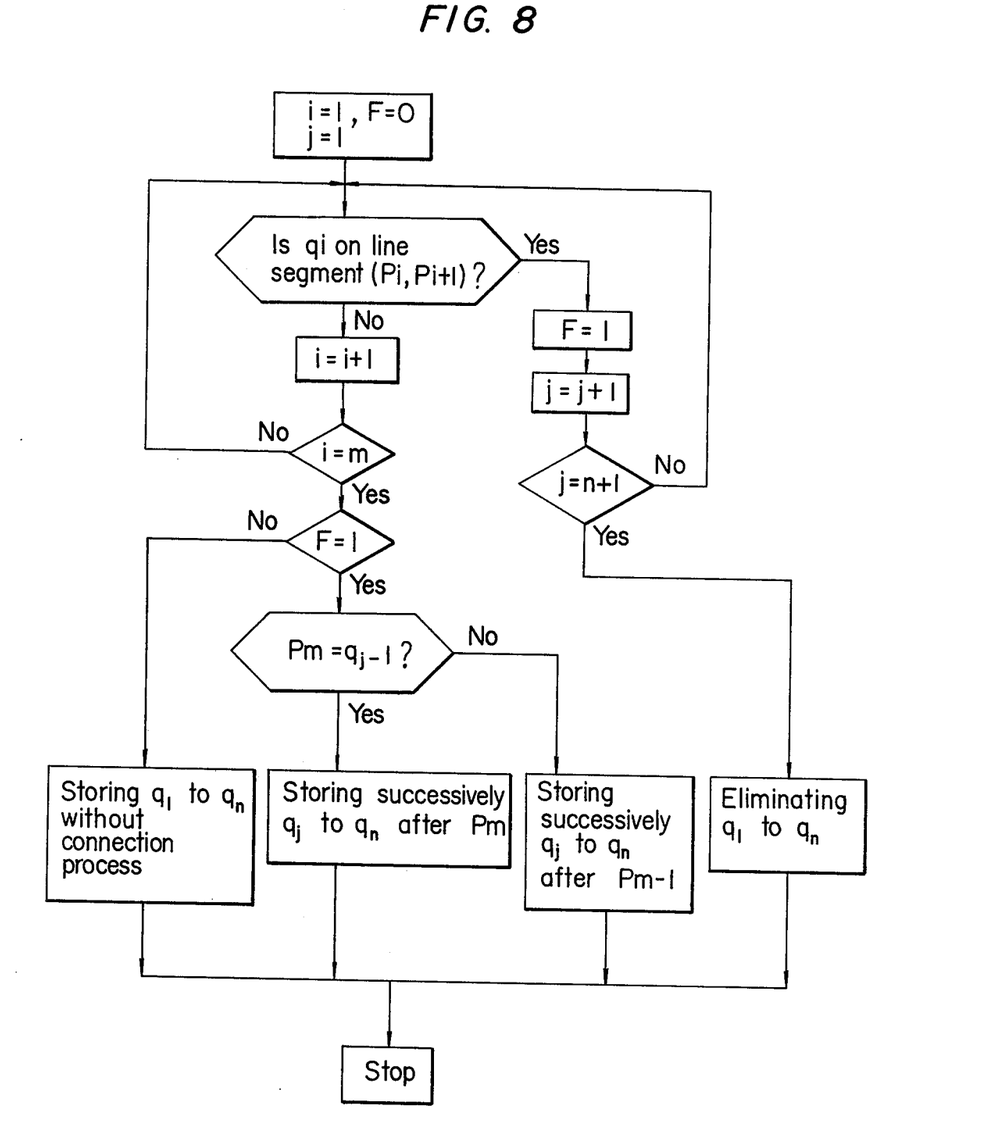
FIG. 8 is a flow diagram showing the steps of line connection performed in accordance with the diagram of FIG. 7.

FIG. 8 is a flow chart showing, by way of example the, steps of the above-described connection processing.

An example of connecting the line a and the line b in the partial pictures shown in FIG. 7 will be described in conjunction with FIG. 8.

In the following description, co-ordinates of the line a and the line b in the regions 11 and 13 will be represented by $p_i$ and $q_j$, and the non-coincident state of the lines a and b will be represented by F=0, and the coincident state thereof by F=1.

First, assuming that $i=1$, $j=1$ and F=0, examination is made as to whether a co-ordinate $q_j$ on the line b, i.e., a co-ordinate $q_1$, exists on a segment of $p_i$ to $p_{i+1}$ of the line a, i.e., a segment of $p_1$ to $p_2$. When the line b does not exist on this segment, then i is replaced by i+1, and examination is made as to whether this i+1 reaches m (m representing the number of feature point co-ordinates of the line a which is now under examination to determine connection state thereof). When i+1 does not reach m, then examination is made as to whether the point $q_1$ exists on a segment of $p_2$ to $p_3$. These steps are repeated unitl i reaches m. On the other hand, when it is ascertained that the point $q_j$ exists on these segments of $p_i$ to $p_{i+1}$, then F=1 is established, j is replaced by j+1, and examination is made as to whether this j+1 reaches n+1 (n representing the number of feature point co-ordinates of the line b which is now under examination to determine the connection state thereof). When j+1 does not reach n+1 then examination is made as to whether the co-ordinate $q_{j+1}$ of the next point exists on a segment of $p_i$ to $p_{i+1}$. These steps are repeated until i reaches m. When i reaches m, then examination is made as to whether the state is F=1. If the state is F=0, then it is assumed that there is no connection, and a line of point co-ordinates of $q_1$ to $q_n$ is taken as a proposed line to be registered in the recognition table 43.

On the other hand, when the state is F=1, then examination as to the possible coincidence of $p_m=q_{j-1}$ is made. If this coincidence is found, then co-ordinates of $q_j$ to $q_n$ are, subsequently to $p_m$, registered in the recognition table 43 as co-ordinates of one line. In the case of $p_m=q_{j-1}$, co-ordinates pf $q_j$ to $q_n$ are, subsequently to $p_{m-1}$, registered in the recognition table 43 as co-ordinates of one line. When j reaches n+1, the points of $q_j$ to $q_n$ are considered to be completely included in points of $p_i$ to $p_m$ and are eliminated.

By means of such processing, connection is made between lines existing in the partial pictures in adjacent small regions.

While, in the above, description has been made with regard to a case of two partial pictures, three partial pictures can be processed with similar steps as the above.

While, in the above, description has been made, by way of example, with regard to connection between lines, connection between characters can be obtained by the same method as indicated in the following description. Co-ordinates of characters existing respectively in partial pictures in adjacent small regions are compared with each other. If there is coincidence between them, then the co-ordinates of one of the characters are eliminated. If there if no coincidence, then the co-ordinates of both characters are registered.

When employing a processor such as a microcomputer or the like, the above-described processing can be performed with ease. Alternatively, an exclusive device which suffices for the above-described functions may be employed to constitute the connection processing unit 26.

The control unit 21 may be constructed with a processor such as a microcomputer or the like.

Random access memories such as microcomputers or the like can be employed as the memories 22 and 24.

The apparatus shown in FIG. 2 may be constructed with a single microcomputer or the like.

Figure 9A:
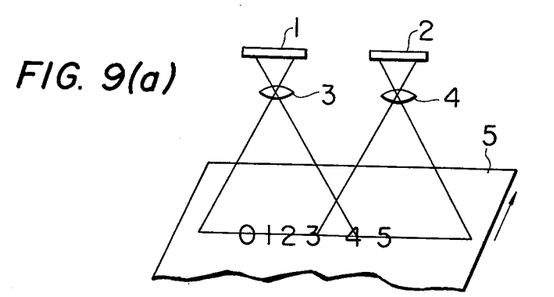
FIGS. 9(a) to 9(c) are flow diagrams for explaining the principle of OCR which materializes the method of pattern recognition of the invention.
Figure 9B:
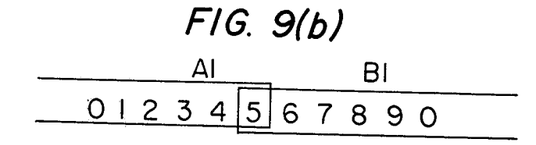
Figure 9C:
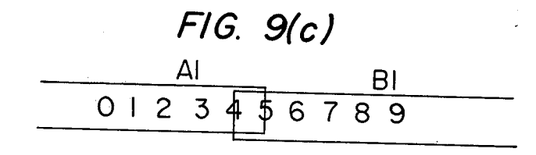

FIG. 9 shows diagrams for explaining the principle of an example of an OCR which operates by the method of pattern recognition according to the invention.

According to FIG. 9, for recognizing characters carried on a large sized document 5, a plurality of sensors 1 and 2 and corresponding lenses 3 and 4 are provided, similarly to the prior art. According to the invention, however, the two adjacent sensors 1 and 2 are so arranged that scannings due to the sensors may partially overlap with respect to each other by a width sufficient to cover one character. Accordingly, regions $A_1$ and $B_1$ which are scanned respectively by the sensors 1 and 2 take the state as shown in FIGS. 9(b), (c). By this, in the vicinity of the overlapped region held in common in the scanning region due to the sensors 1 and 2, a character can always be included, in its complete form, within at least one of these scanning regions. For example, in FIG. 9(b), the character "5" is included, in its complete form, within both scanning regions $A_1$ and $B_1$ of both sensors 1 and 2. In FIG. 9(c), the character "4" is included within the scanning region $A_1$ of the sensor 1, and the character "5" is included within the scanning region $B_1$ of the sensor 2, both in their complete forms.

Figure 10:
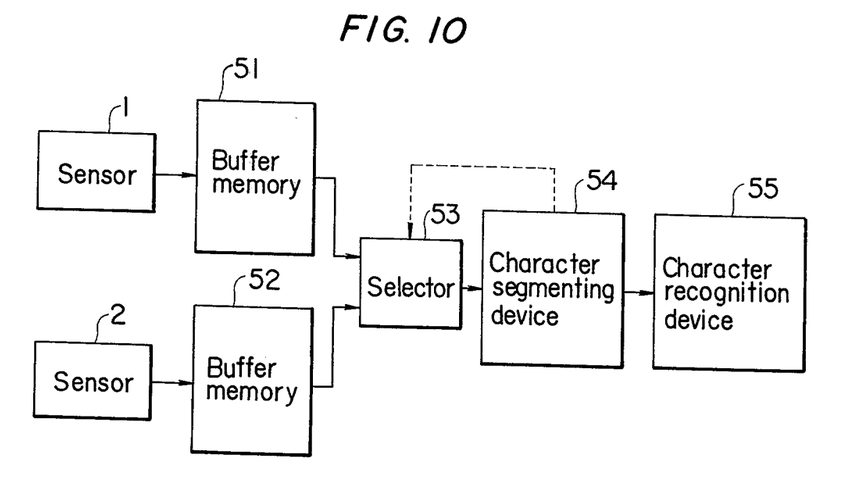
FIGS. 10 and 11 show the constructions of examples of an OCR according to the principle explained in conjunction with FIG. 9.

FIG. 10 shows the construction of an OCR according to the principle described in conjunction with FIG. 9. In FIG. 10, the numerals 51 and 52 indicate buffer memories which are adapted to store respectively an amount of one row of images contained within the regions which are scanned respectively with the sensors 1 and 2. The numeral 53 indicates a selector, the numeral 54 a character segmenting device, and the numeral 55 a character recognition device.

In such a construction, respective amounts of one row of the images, which are taken up by the sensors 1 and 2, are stored respectively in the buffer memories 51 and 52. Then, the image stored in the buffer memory 51 is selected to be transferred to the character segmenting device 54 for segmenting characters in sequence. Such segmented characters are then recognized in the character recognition device 55.

Then, the image stored in the buffer memory 52 is selected by the selector 53 for processing in a similar manner as the above. The character recognition device 55 tallies these recognition results with respect to each other and eliminates one of two data items which have been recognized as a duplication; thus, the final recognition result is obtained.

Figure 11:
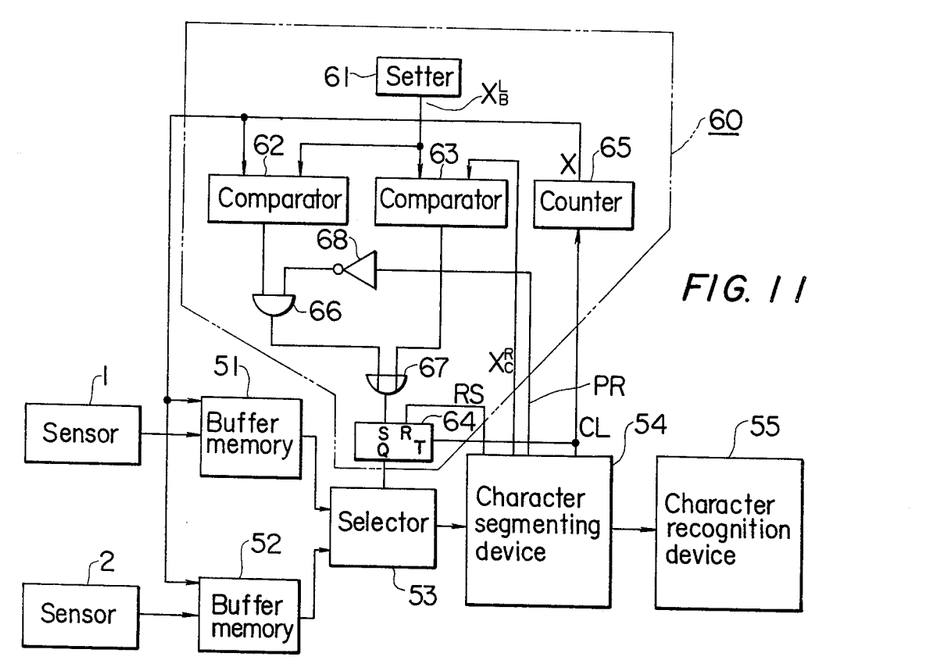
Figure 12A:
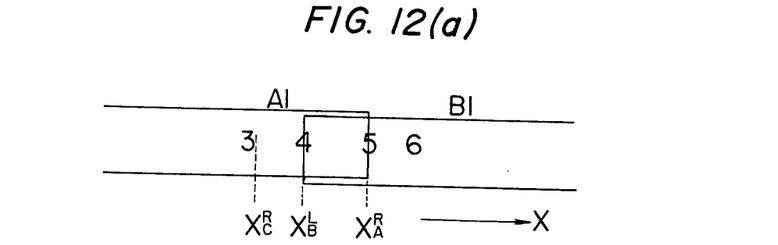
FIGS. 12(a) and 12(b) are diagrams for explaining the action of the example of FIG. 11.
Figure 12B:
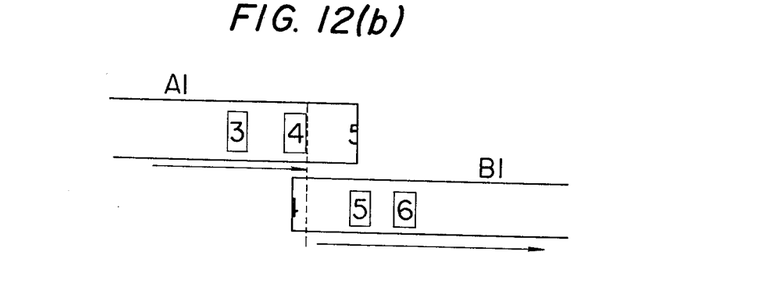

FIG. 11 shows another example of an OCR in accordance with the principle of the invention described in conjunction with FIG. 9. FIG. 12 shows diagrams for explaining the action of the embodiment of FIG. 11.

FIG. 12(a) shows images in the regions $A_1$ and $B_1$ which are scanned with the sensors 1 and 2. In the following description, the co-ordinate of the right-hand end of the region $A_1$ will be represented by $X_A{}^R$, the co-ordinate of the left-hand end of the region $B_1$ by $X_B{}^L$, and the co-ordinate of the right-hand end of a segment character by $X_C{}^R$.

According to FIG. 12, first, an image in the region $A_1$, which has been stored in the buffer memory 51, is read out starting from its right-hand end, and is segmented. When the right-hand end $X_C{}^R$ of a segmented character pattern has passed over the left-hand end $X_B{}^L$ of the pattern of the region $B_1$ of the buffer memory 52, i.e., when a relationship of $X_B{}^L < X_C{}^R$ has been reached, then a pattern in the region $B_1$, which has been stored in the buffer memory 52, is read out starting from its position of $X_C{}^R + 1$, and is segmented, as shown in FIG. 12(b). Here, as shown in FIG. 9(b), at the time when the left-hand end $X_B{}^L$ of the region $B_1$ has reached the segmented position of the region $A_1$, if there is no character pattern, then the reading out position of the region $B_1$ is changed to $X_B{}^L + 1$.

The apparatus shown in FIG. 11 is employed for the processing described above. The apparatus of FIG. 11 includes a selective control circuit 60 in addition to the construction of FIG. 10.

In the selective control circuit 60, the numeral 61 indicates a setter for setting $X_B{}^L$, the numerals 62 and 63 indicate comparators, the numeral 64 indicates a flip-flop, the numeral 65 represents a co-ordinate counter, the numeral 66 identifies an AND gate, the numeral 67 indicates an OR gate, and the numeral 68 represents an inverter. The character segmenting device 54 supplies the control circuit 60 with clock signals CL, right-hand end co-ordinates $X_C{}^R$ of segmented characters, reset signals RS, and signals PR which indicate whether a segmented portion coincides with a character pattern region.

In such construction, the co-ordinate counter 65 counts a clock signal CL supplied from the character segmenting device 54 and outputs a signal X which indicates a position which is now under segmentation. The comparator 62 compares this co-ordinate value X with a set value $X_B{}^L$ from the setter 61, and, when a relationship of $X > X_B{}^L$ is achieved, outputs a signal "1". At this time, if a character pattern region is not under segmentation, then the output of the inverter 68 becomes "1" and sets, through the AND gate 66 and the OR gate 67, the flip-flop 64 in time with the clock signal CL, and this set output, in its turn, enables the selector 53 for changeover from the buffer memory 51 to the buffer memory 52. On the other hand, the comparator 63 compares the co-ordinate $X_C{}^R$ of the right-hand end of a character pattern, which is now under segmentation, with the set value $X_B{}^L$, and, when a relationship of $X_C{}^R > X_B{}^L$ is achieved, outputs a signal "1" and sets, through the OR gate 67, the flip-flop 64; thus, changeover between the buffer memories is made in a similar manner as the above. Resetting of the flip-flop 64 is effected by a reset signal RS.

In the case of scanning the document 5 with the sensors 1 and 2 shown in FIG. 9(a), the sensors 1 and 2 may be fixed in position while the document 5 is moved with respect to the sensors, or alternatively, the document 5 may be fixed in position while the sensors 1 and 2 are moved with respect to the document.

Further, in place of the two buffer memories shown in FIGS. 10 and 11, one buffer memory may be provided for storage, segmentation and recognition on a one-by-one basis of the scanning regions. In this case, of course, the selector 53 and the selective control circuit 60 are not needed.

The character segmenting device 54 and the character recognition device 55 may be constructed with any known devices.

In the examples of an OCR shown in FIGS. 9 to 12, by providing an overlapped region, erroneous recognition due to discrepancy at connection points between partial pictures can be avoided, thus correct recognition being obtained.

Since, in accordance with the invention, segmentation and recognition are made on a one-by-one basis of partial pictures, the required storage capacity of the memory is a capacity which can store only one partial picture, and accordingly the storage capacity may be small.

As will be understood from the above description, according to the invention, recognition of a large sized picture can be obtained with high accuracy, and the storage capacity of memory for storing pattern signals from the picture can be very small.

While the description of the invention has been made in conjunction with the preferred embodiments, it should be understood that those skilled in the art can make various changes and modifications without departing from the spirit and scope of the invention.

What is claimed is:

1. A method for recognizing at least one line pattern in a picture comprising:
   a first step of converting an image of a desired partial picture in the picture into pattern signals, said picture being constructed of a plurality of partial pictures formed by dividing said picture, adjacent ones of said partial pictures having in common a partially-overlapped region;
   a second step of recognizing the coordinates of feature points representing a partial line pattern in each partial picture on the basis of the pattern signals obtained in said first step; and
   a third step of connecting the partial line patterns in the respective partial pictures on the basis of the coordinates obtained in said second step thereby recognizing the line pattern of the whole of the picture.

2. A method of pattern recognition according to claim 1, wherein said second step comprises a step of detecting a picture element on the partial line pattern and a step of establishing a window region, the center of which is the position of the picture element so as to detect other picture elements in the window region and to move the window region to the center of the detected picture elements, thereby tracing the partial line pattern.

3. A method for pattern recognition comprising:
   a first step of converting an image carried on a desired scanning region of a document into pattern signals, the document being divided so as to form a plurality of scanning regions, adjacent scanning regions being partially overlapped; and
   a second step of segmenting in turn characters from the pattern signals so that, in response to the position of characters segmented from the first scanning region, the segmenting of the characters in the second scanning region adjacent to the first scanning region is determined.

4. An apparatus for recognizing at least one line pattern in a picture comprising:
   first means for converting an image of a desired partial picture in the picture into pattern signals, said picture being constructed of a plurality of partial pictures formed by dividing said picture, adjacent ones of said partial picture having in common a partially-overlapped region;
   second means for recognizing the coordinates of feature points representing a partial line pattern in each partial picture on the basis of the pattern signals obtained by said first means; and
   third means for connecting the partial line patterns in the respective partial pictures on the basis of the coordinates obtained by said second means, thereby recognizing the line pattern of the whole of the picture.

5. An apparatus for pattern recognition comprising:
   conversion means for converting an image carried on a desired partial picture in a picture onto pattern signals, said picture being constructed with a plurality of partial pictures formed by dividing said picture, adjacent ones of said partial pictures having in common a partially-overlapped region, said conversion means including a pattern inputting device for generating said pattern signals, driving means for moving said pattern inputting device in horizontal and vertical directions and control means for controlling said driving means to move the driving means to a desired position to effect scanning of a desired partial picture by said pattern inputting device;
   memory means for temporarily storing the pattern signals obtained by said conversion means; and
   first recognition means operative on a one-by-one basis of the partial pictures for recognition processing pattern signals read out from said memory means.

6. An apparatus for pattern recognition according to claim 5, wherein said pattern inputting means includes an image pick-up device for picking up the image of each partial picture.

7. An apparatus according to claims 5 or 6, further including second recognition means responsive to the recognition results obtained by said first recognition means for effecting recognition of the image of the whole of said picture.

8. An apparatus according to claim 6, wherein said first recognition means consist of means for recognizing signals of characters and lines of the partial picture, and said second recognition means consist of means for connecting lines of the adjacent partial pictures with respect to each other.

* * * * *